July 16, 1935.  J. J. WHITE  2,008,572
ARTICLE CONVEYING AND DISTRIBUTING APPARATUS
Filed Dec. 6, 1933  2 Sheets-Sheet 2
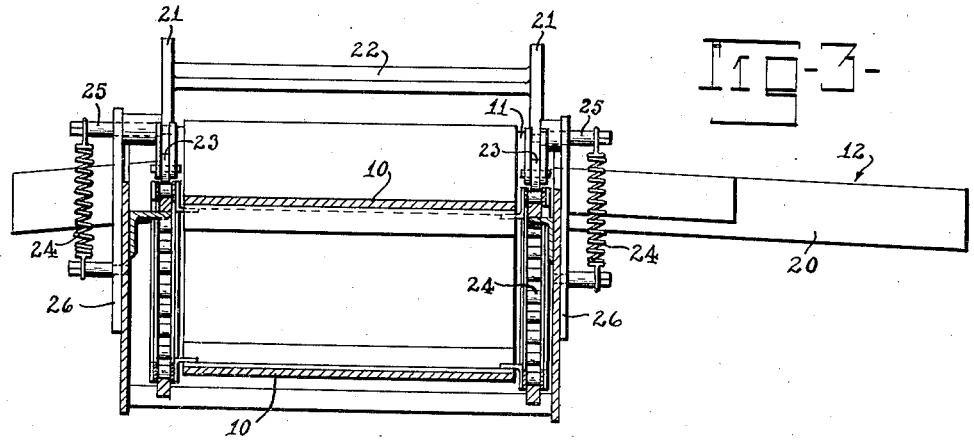
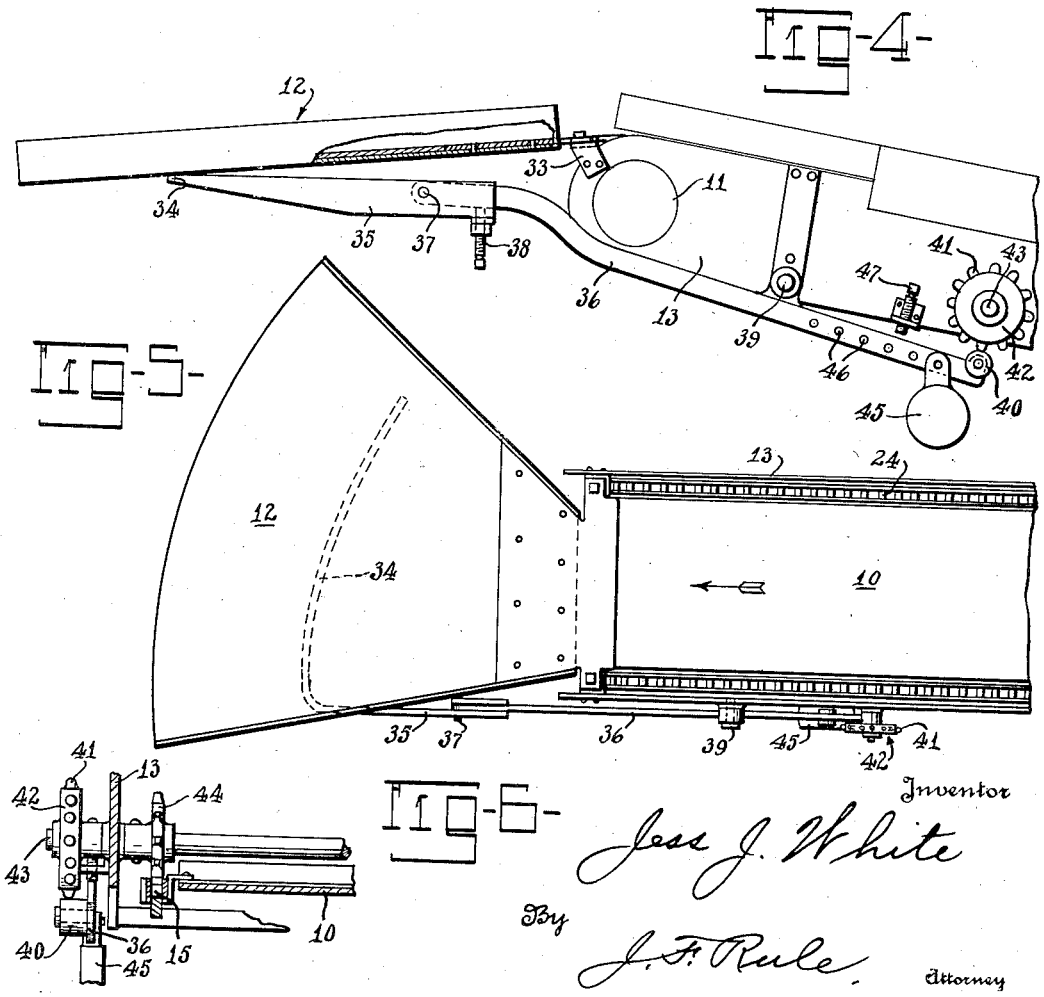

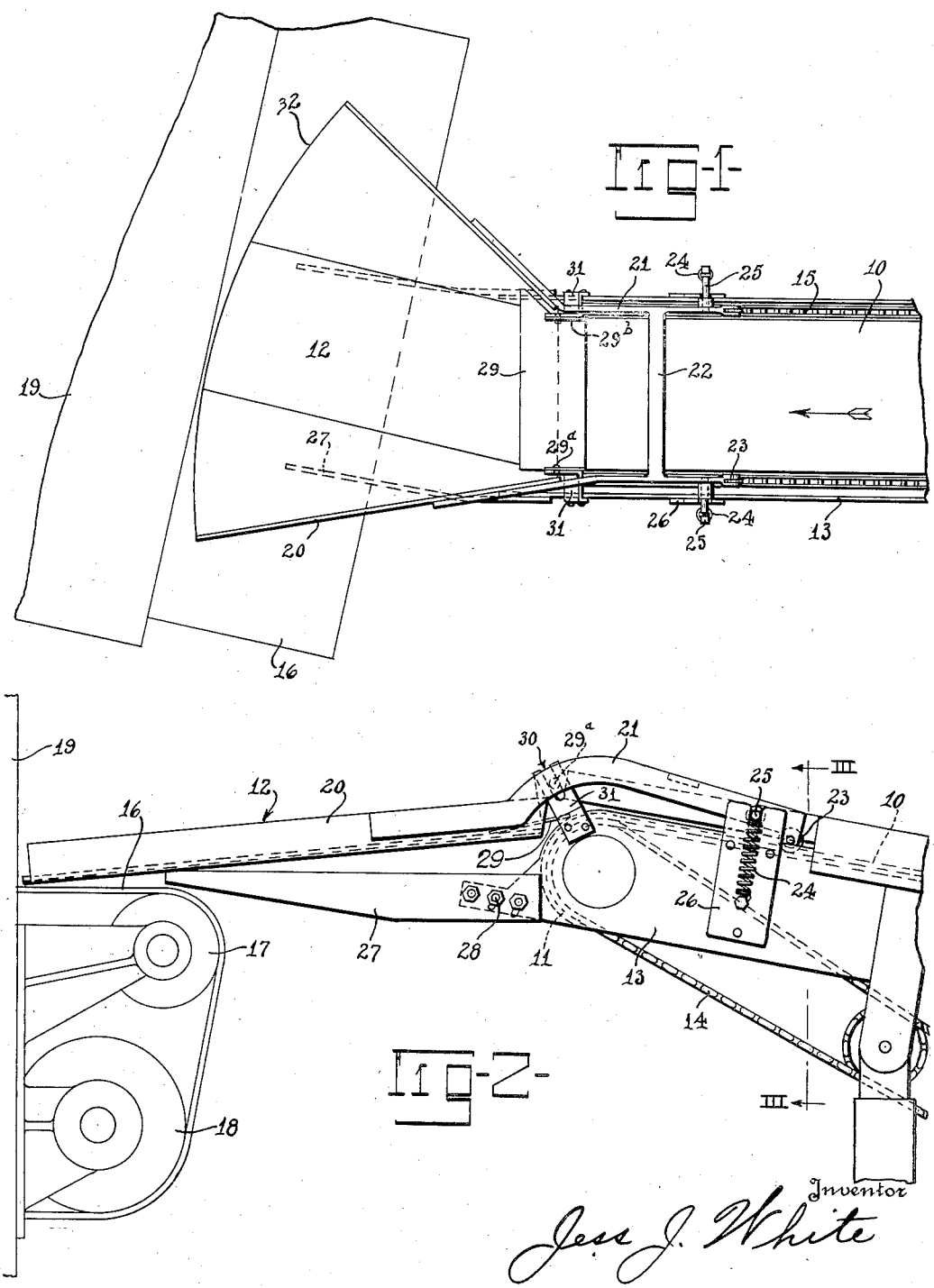

Patented July 16, 1935

2,008,572

UNITED STATES PATENT OFFICE 2,008,572

ARTICLE CONVEYING AND DISTRIBUTING APPARATUS

Jess J. White, Alton, Ill., assignor to Owens-Illinois Glass Company, a corporation of Ohio Application December 6, 1933, Serial No. 701,139

4 Claims. (Cl. 198—65)

My invention relates to an apparatus for conveying and distributing articles. As herein shown, the invention is designed for conveying articles such as small bottles to an annealing leer and distributing them uniformly on the leer conveyor.

An object of the invention is to provide a simple, practical and efficient apparatus for automatically distributing such articles evenly across the leer conveyor.

Other objects of the invention will appear hereinafter.

In the accompanying drawings:

Fig. 1 is a plan view of an apparatus constructed in accordance with my invention.

Fig. 2 is a side elevation of the same.

Fig. 3 is a section at the line III—III on Fig. 2.

Fig. 4 is a side elevation, partly broken away, showing a modified construction.

Fig. 5 is a plan view of the apparatus shown on Fig. 4.

Fig. 6 is a detail view of this vibrator shown in Figs. 4 and 5.

Referring particularly to Figs. 1, 2, and 3, an endless belt conveyor 10 running over a roll 11 conveys articles, as, for example, small bottles or jars, which have just been discharged from a forming machine and delivers them to a fan-shaped chute 12. The conveyor is supported on a frame 13 and driving power is transmitted thereto through a sprocket chain 14. Sprocket chains 15 are connected to the conveyor 10 along the margins thereof and run over sprockets connected to the roll 11, providing a positive driving connection between the conveyor belt and the roll 11.

The forward or discharge end of the chute 12 overlies the leer conveyor 16 which comprises an endless belt or apron running over rolls 17 and 18, the conveyor 16 extending as usual lengthwise through an annealing leer 19. The chute 12 is provided with side bars 20 to which is attached a frame comprising rearwardly extending arms 21 and a cross bar 22. At the rear ends of the arms 21 are mounted rolls 23 which run on the sprocket chains 15. The rolls are held downward against said chains with a yielding pressure by means of coil springs 24 connected at their upper ends to pins 25 attached to the arms 21. Said pins engage in slots formed in the upper ends of plates 26 secured to the frame 13, the lower ends of the springs 24 being anchored to said plate.

The chute 12 is supported near its forward end on arms 27 attached to the frame 13. Bolts 28 extending through slots in said arms 27 provide for up and down adjustment of the arms and of the forward end of the chute. A bridge plate 29 spans the gap between the discharge end of the conveyor 10 and chute 12, being removably held in position by guide pins 29ª at the upper end of a pair of vertical arms 29ᵇ on said plate. These pins are guided on slots 30 formed in brackets 31 attached to the conveyor frame 13.

The operation is as follows: The conveyor 10 which is driven continuously carries the bottles or other articles forward and discharges them onto chute 12. The rolls 23 are vibrated up and down by the chains 15 running therebeneath, each link of a chain causing a short vibration of the roll, thus imparting an up and down vibratory movement to the arms 21 and to the chute 12 which is rigidly attached to said arms. This vibratory motion serves to shake the articles which have been deposited on the chute 12 and distribute them substantially uniformly over the surface of said chute. The vibratory motion of the chute causes the articles to move forward and at the same time spreads them laterally so as to extend across the entire width of the chute. The articles are discharged along the entire front edge of the chute and thus given a substantially even distribution across practically the entire width of the leer conveyor 16. It will be noted that the forward edge 32 of the chute is convexly curved in a manner to facilitate the uniform discharge of the articles at all points along said edge.

Referring to the modified construction shown in Figs. 4, 5, and 6, the chute 12 is anchored at its rear end to brackets 33 on the frame 13 and is supported adjacent its forward end on an arm 34 extending transversely therebeneath. The arm 34 is bent to provide a section 35 extending rearwardly at one side of the chute and connected adjacent its rear end to an arm 36. The connection comprises a pivot pin 37. An adjusting screw 38 permits adjustment of the arm 34 about the pivot 37 for adjusting the forward end of the chute up or down. The arm 36 intermediate its ends is connected by a pivot 39 to the conveyor frame 13. The rear end of the arm 36 carries a roll 40 which engages cam lugs 41 arranged in an annular series on the periphery of a wheel 42 fixed to a shaft 43 (Fig. 6). Said shaft is journaled in the frame 13 and carries a sprocket wheel 44 which runs on one of the conveyor chains 15.

It will be seen that with this construction, the forward movement of the conveyor chain will rotate the wheel 42, causing the cam lugs 41 to successively engage the roll 40, thereby oscillating or vibrating the arm 36 up and down about its fulcrum 39 and thus imparting an up and down vibratory movement to the chute 12. The weight of the chute and the articles thereon is sufficient to hold the roll 40 in operative engagement with the lugs 41. Excessive pressure of the roll 40 against the lugs 41 may be prevented by a counter-weight 45 attached to the arm 36. A series of holes 46 provide means for adjustably attaching the weight 45 at different points along the arm 36 for adjustably varying the counterbalancing action of the weight. An adjustable stop 47 which, as shown in Fig. 4, is in the form of a screw bolt, is positioned in the path of the lever arm 36 and can be adjusted to limit the amplitude of vibration of said arm. In this manner the vibratory movement of the chute can be adjustably regulated.

Modifications may be resorted to within the spirit and scope of my invention.

What I claim is:

1. The combination of a belt conveyor, a leer conveyor spaced therefrom and of greater width than said belt conveyor, a chute interposed between said conveyors in position to receive articles from the belt conveyor and deliver them to the leer conveyor, said chute having side walls flared outwardly from the belt conveyor toward the leer conveyor, automatic means for vibrating said chute and thereby spreading the articles laterally thereover during their passage from the belt conveyor to the leer conveyor, said vibrating means comprising an arm, a roll thereon, and a sprocket chain constituting part of driving means for the belt conveyor engaging and vibrating said roll and arm and causing the latter to impart vibratory movement to the chute.

2. The combination of a belt conveyor, a sprocket chain connected thereto for travel therewith, a chute in position to receive articles from said conveyor, a frame supporting the conveyor and including an extension at one end to at least in part support the chute, an arm extending from the receiving end of the chute above the chain, and a roll on the arm adapted to engage the chain and be actuated thereby for imparting a vertical vibratory movement to said arm and chute.

3. The combination of a belt conveyor, a sprocket chain connected thereto for travel therewith, a chute in position to receive articles from said conveyor, a frame supporting the conveyor and including an extension at one end to at least in part support the chute, an arm extending from the receiving end of the chute, a roll on the arm adapted to engage the chain and be actuated thereby for imparting a vertical vibratory movement to said arm and chute, and means for yieldingly holding said roll in engagement with the chain.

4. The combination of a belt conveyor, a sprocket chain connected thereto for travel therewith, a chute in position to receive articles from said conveyor, a frame supporting the conveyor and including an extension at one end to at least in part support the chute, an arm extending from the receiving end of the chute, a roll on the arm adapted to engage the chain and be actuated thereby for imparting a vertical vibratory movement to said arm and chute, a plate attached to said frame in proximity to the free end of said arm and having an upwardly opening slot therein, a pin on the arm projecting into the slot, and a spring normally operating to yieldingly hold the pin against complete removal from said slot.

JESS J. WHITE.